United States Patent

Newberg et al.

[11] Patent Number: 5,857,780
[45] Date of Patent: Jan. 12, 1999

[54] SELF-ALIGNING/RIGID SPHERICAL BEARING ASSEMBLY

[75] Inventors: Barry M. Newberg, Florissant; William Lewis, Hazelwood, both of Mo.; Philip S. Johnson, Granite City, Ill.

[73] Assignee: Emerson Electric Co., St. Louis, Mo.

[21] Appl. No.: 861,951

[22] Filed: May 22, 1997

[51] Int. Cl.[6] .................................................. F16C 23/04
[52] U.S. Cl. .................................... 384/206; 384/906
[58] Field of Search ................................. 384/206–214, 384/903, 906

[56] References Cited

U.S. PATENT DOCUMENTS 4,213,600  7/1980  Yasui et al. ............................. 384/903
5,170,564  12/1992  Kaiser .................................... 384/206

Primary Examiner—Lenard A. Footland
Attorney, Agent, or Firm—Howell & Haferkamp L.C.

[57] ABSTRACT

A bearing assembly permits one bearing bushing to be employed in both applications that permit self-aligning pivoting movement of a rotating shaft and applications that rigidly support a rotating shaft, thereby eliminating the need to inventory two different types of bearings for these two different applications.

20 Claims, 3 Drawing Sheets

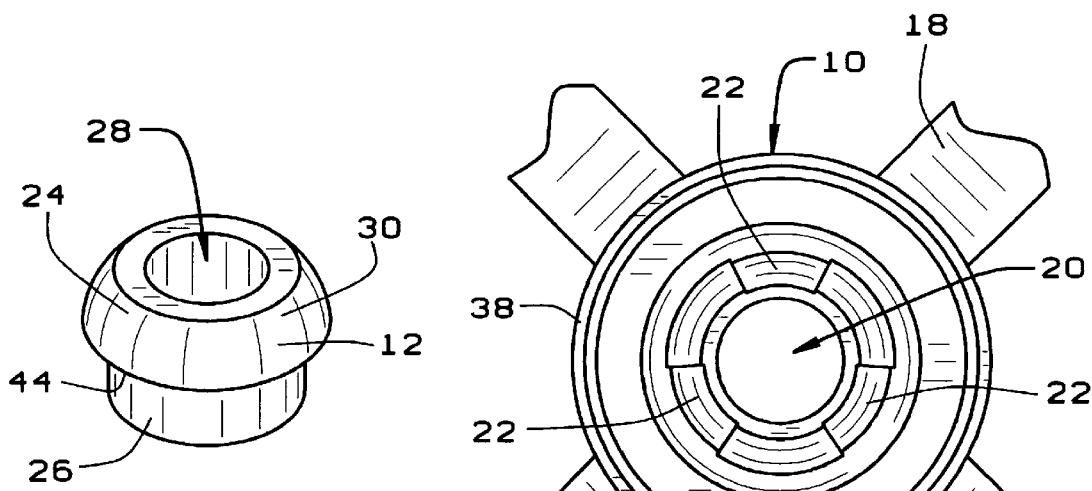
FIG. 2 PRIOR ART
FIG. 3 PRIOR ART
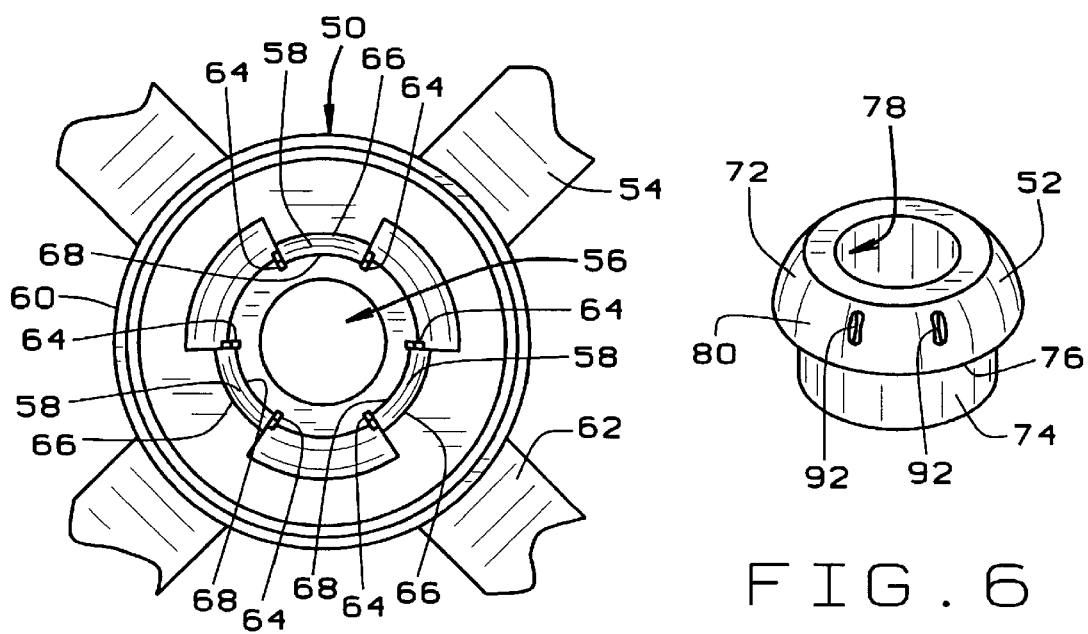
FIG. 4
FIG. 6

1

SELF-ALIGNING/RIGID SPHERICAL BEARING ASSEMBLY

BACKGROUND OF THE INVENTION (1) Field of the Invention

The present invention pertains to a bearing assembly that is equally well-suited for use in self-aligning and rigid shaft supporting applications. More particularly, the bearing assembly of the invention permits one bearing bushing to be employed in both applications that permit self-aligning pivoting movement of the support for a rotating shaft and applications that rigidly support a rotating shaft, thereby eliminating the need to inventory two different types of bearings for these two different applications.

(2) Description of the Related Art

Self-aligning bearing assemblies are often used in environments where the bearing assembly provides support from a structure to a rotating shaft while permitting a limited degree of shaft pivoting movement relative to the supporting structure. A typical application of this type is found on the output shaft of an electric motor, although self-aligning bearing assemblies are employed in various other applications. This illustrative environment of the prior art self-aligning bearing assembly is shown in drawing FIGS. 1–3.

The typical prior art self-aligning bearing assembly is comprised of a bearing seat 10, a bearing bushing 12, a retaining ring 14, and a sealing cap 16.

In the application shown in FIGS. 1–3, the bearing seat 10 is formed as part of an end shield 18 of an electric motor housing. The bearing seat 10 is cast integrally with the housing end shield 18. Aluminum is often employed in casting the bearing seat and the end shield. The bearing seat has a shaft opening 20 through its center. When the end shield 18 is assembled to an electric motor (not shown) the rotor shaft of the motor will pass through the shaft opening 20. A bearing land surface 22 supports the bearing bushing 12 in sliding engagement extends around the shaft opening 20. In some bearing seats the land surface extends as a single continuous surface around the shaft opening, and in other bearing seats the land surface is actually formed as several separate surfaces that are spacially arranged around the shaft opening. In the illustrative prior art shown in FIGS. 1–3, the bearing land surface 22 is shown as three separate surface sections spacially arranged around the shaft opening 20. In cross-section, the land surfaces 22 have a concave configuration. Together the land surfaces 22 define a cup or socket shape with the shaft opening 20 at the bottom, center of the socket shape.

Referring to FIG. 2, the prior art bearing bushing 12 has a semi-spherical forward end 24 and a cylindrical rearward end 26. A shaft bore 28 extends axially through the center of the bushing. The interior diameter of the shaft bore 28 is sized to securely mount the motor shaft for rotation in the bore. The semi-spherical forward end 24 of the bushing is defined by the spherical shape of the bushings bearing surface 30 that mates in sliding engagement with the land surfaces 22 of the bearing seat. The shape of the bearing surface 30 is complimentary to the curvature of the bearing seat land surfaces 22. This enables the bearing bushing 12 to pivot to a limited extent on the bearing land surfaces. The bearing bushing 12 is often constructed of powdered metal iron graphite that is a softer material than the aluminum employed in constructing the bearing seat 10. The powdered metal of the bearing bushing is also porous which enables the bearing surface 30 to retain lubricant which enhances its ability to pivot on the bearing seat land surfaces 22.

The method of assembling the prior art self-aligning bearing assembly is shown in FIG. 1. The motor end shield 18 is shown placed face down with the interior surface 32, or that surface that would face the stator and rotor of the electric motor, facing upwardly. The bearing seat 10 is shown at the center of the end shield 18. The bearing bushing 12 is placed in the bearing seat 10 with the bearing surface 30 of the bushing resting on the land surfaces 22 of the bearing seat. A tooling pilot shaft 34 is inserted through the shaft bore 28 of the bushing. The retaining ring 14 functions somewhat like a Belleville spring and is placed over the shaft and press-fit into a cylindrical collar 38 of the bearing seat that extends upwardly from the land surfaces 22. Projecting tabs 40 of the retainer engage against the interior surface of the cylindrical collar 38 and hold the retaining ring in its position pressed downwardly into the cylindrical collar. A center ring 42 of the retainer passes around the cylindrical rearward end 26 of the bearing bushing and engages against an annular shoulder 44 of the bearing bushing that separates the cylindrical rearward end 26 from the semi-spherical forward end 24. When inserted completely into the cylindrical collar 38, the center ring 42 of the retaining ring 36 exerts a biasing force against the annular shoulder 44 of the bearing bushing that forces the bearing surface 30 of the bushing into engagement with the land surfaces 22 of the bearing seat. This biasing force also produces the correcting or centering force on the bearing bushing 12 that urges the bearing bushing 12 to return to a position where a center axis passing through the bearing bushing shaft bore 28 is aligned coaxially with a center axis passing through the bearing seat shaft opening 20. In completing the construction of the prior art self-aligning bearing assembly, a lubricant may be applied within the cylindrical collar 38 of the bearing seat 10 and then the sealing cap 16 is press-fit into the cylindrical collar 38 to retain the lubricant and complete the assembly of the self-aligning bearing assembly.

A primary benefit provided by the self-aligning bearing assembly is that the motor end shield 18 does not have to be perfectly aligned with the center axis of the electric motor rotor and stator when the end shield is assembled to the motor, i.e., the center axis (not shown) of the end shield bearing seat shaft opening 20 does not have to be perfectly aligned with the center axes of the electric motor rotor and the electric motor stator. If these axes are not perfectly aligned when the end shield 18 is assembled to the electric motor, the bearing bushing 12 will pivot slightly on the bearing seat land surfaces 22 to compensate for the misalignment and thereby support the motor shaft for rotation in the end shield 18 without having the end shield perfectly oriented relative to the shaft.

In the construction of electric motors, there are applications where the motor end shield must be properly positioned relative to the shaft. In these applications, the end shield itself is used to orient the motor shaft relative to the environment in which the motor is used. For example, where the electric motor is used to power a transmission such as a gearing transmission, the motor end shield would typically be connected directly to the supporting structure, i.e., the casing of the gearing transmission. If the motor shaft was improperly oriented relative to the motor end shield, for example if the shaft center axis was not perfectly aligned with the center axis of the end shield shaft opening, then the shaft would not be perfectly aligned with the center axes of the gears employed in the gearing transmission attached to the motor end shield. This would result in gears of the transmission not properly meshing with each other and often produced accelerated and uneven wearing of the gear teeth. Similar problems would also occur in other environments. For example, if the motor were powering a belt and pulley transmission, the center axis of the drive pulley mounted on the motor shaft would not be aligned parallel with the driven pulley of the transmission. This would also result in accelerated wear of the belt connected between the drive and driven pulleys. Also, if the motor were used to power a pump, the misalignment of the motor shaft and the pump shaft could cause pump seals to wear and leak. Therefore, in those applications where it was required that the motor shaft center axis be aligned with the center axis of the end shield shaft opening, a fixed bearing assembly was needed which would hold securely the shaft relative to the motor end shield and not permit any misalignment or pivoting movement of the motor shaft.

The two different environments described above have required two different bearing assemblies, i.e., one bearing assembly that would permit self-aligning movement of the motor shaft relative to the supporting structure or end shield of the bearing seat, and a second bearing assembly that would hold the motor shaft securely relative to the supporting structure or the bearing seat of the motor end shield. This required manufacturers of electric motors to inventory two different types of bearing assemblies for their motors which resulted in incurring additional costs for inventorying these two different types of bearing assemblies.

SUMMARY OF THE INVENTION

The present invention overcomes disadvantages associated with prior art bearing assemblies in that it provides a modification to the typical construction of a self-aligning bearing assembly that permits it to be used in an environment where rigid support of a rotating shaft is needed. The modification permits the use of several of the component parts of the self-aligning bearing assembly in a bearing assembly that provides rigid shaft support, thereby reducing the number of different parts needed to be inventoried for both of these bearing applications.

The bearing assembly of the present invention makes use of the bearing bushing, retaining ring and sealing cap of the prior art self-aligning bearing assembly. The only modification to the bearing assembly of the present invention that enables it to be used as a rigid shaft supporting bearing assembly is provided in the construction of the bearing seat. This modified bearing seat may be employed in various different motor end shields, which often have different external features to meet specific requirements for mountings or other terminating requirements.

The modified bearing seat is constructed substantially identically to that of the prior art self-aligning bearing assembly described earlier. However, projections are added to the bearing seat on arcuately opposite sides of the land surfaces. These projections are formed as small ribs that follow the curved configuration of the land surfaces but project slightly upwardly from the land surfaces.

The assembly of the rigid shaft supporting bearing assembly is substantially identical to that of the self-aligning bearing assembly. However, a specialized assembly table is provided for this purpose. The table is basically a flat surface having an assembly shaft secured to and projecting upwardly from the flat surface. The center axis of the assembly shaft is perpendicular to the plane of the assembly table. The motor end shield having the modified bearing surface is first positioned over the assembly shaft and placed on the assembly table with the assembly shaft projecting upwardly through the bearing seat shaft opening. The bearing bushing is then slipped over the assembly shaft and positioned downwardly on the shaft so that the bushing bearing surface engages against the projecting ribs on the opposite sides of the bearing seat land surfaces. An anvil piece is then slipped downwardly over the assembly shaft and rests on the cylindrical rearward end of the bearing bushing. A downward force is then applied to the anvil, forcing the bearing surface of the bushing downwardly onto the projecting ribs. The magnitude of the force is determined so that it is sufficiently large to cause the projecting ribs to deform the bearing surface of the bushing and extend into the deformations formed. However, as the bearing bushing continues to move downwardly by the ribs deforming the bushing bearing surface and projecting upwardly into the deformations, the remainder of the bushing bearing surface comes into engagement with the land surfaces, thereby increasing the surface area of contact between the bushing bearing surface and the bearing seat. At this point in the assembly of the bearing bushing into the bearing seat, the force applied to the anvil is not large enough to continue deformation of the bushing bearing surface and the downward movement of the bearing bushing relative to the bearing seat ceases. The extent that the ribs project outwardly from the bearing surface and the magnitude of the force applied to the anvil are sufficient to cause the creation of the deformations in the spherical bushing surface without appreciably changing or distorting the shaft bore 28 of the bushing. With the bushing seated against the land surfaces, the retaining ring is next installed. The anvil is then removed from the shaft and the bearing bushing and motor end shield are removed from the assembly shaft. With the bearing bushing positioned in the bearing seat with the bearing seat projections engaging in the bushing bearing surface deformations, the remainder of the component parts of the bearing assembly, i.e. the lubricant and sealing cap, are assembled in the same manner as in the prior art.

The engagement of the bearing seat projections in the bushing bearing surface deformations prevents the bushing from pivoting relative to the bearing seat as was possible in the self-aligning bearing assembly. In this manner, the bearing bushing is fixed rigidly relative to the bearing seat and the motor end shield and provides rigid support of the motor shaft relative to the end shield. Therefore, with the modification of providing the projections in the bearing seat on opposite sides of the bearing seat land surfaces, the bearing bushing, retaining ring, and sealing cap of the prior art self-aligning bearing assembly may be employed in a bearing assembly that provides rigid shaft support thereby reducing the total number of component parts needed in inventory to provide both a self-aligning bearing assembly and a rigid shaft supporting bearing assembly.

BRIEF DESCRIPTION OF THE DRAWINGS

Further objects and features of the present invention are revealed in the following detailed description of the preferred embodiment of the invention and in the drawing figures wherein:

FIG. 2 is an isometric view of the prior art bearing bushing;

FIG. 3 is a fragmented plan view of the prior art bearing seat;

FIG. 4 is a fragmented plan view of the modified bearing seat of the present invention;

FIG. 6 is an isometric view of the bearing bushing of the modified rigid bearing assembly after it has been deformed.

DESCRIPTION OF THE PREFERRED EMBODIMENT

Figure 1:
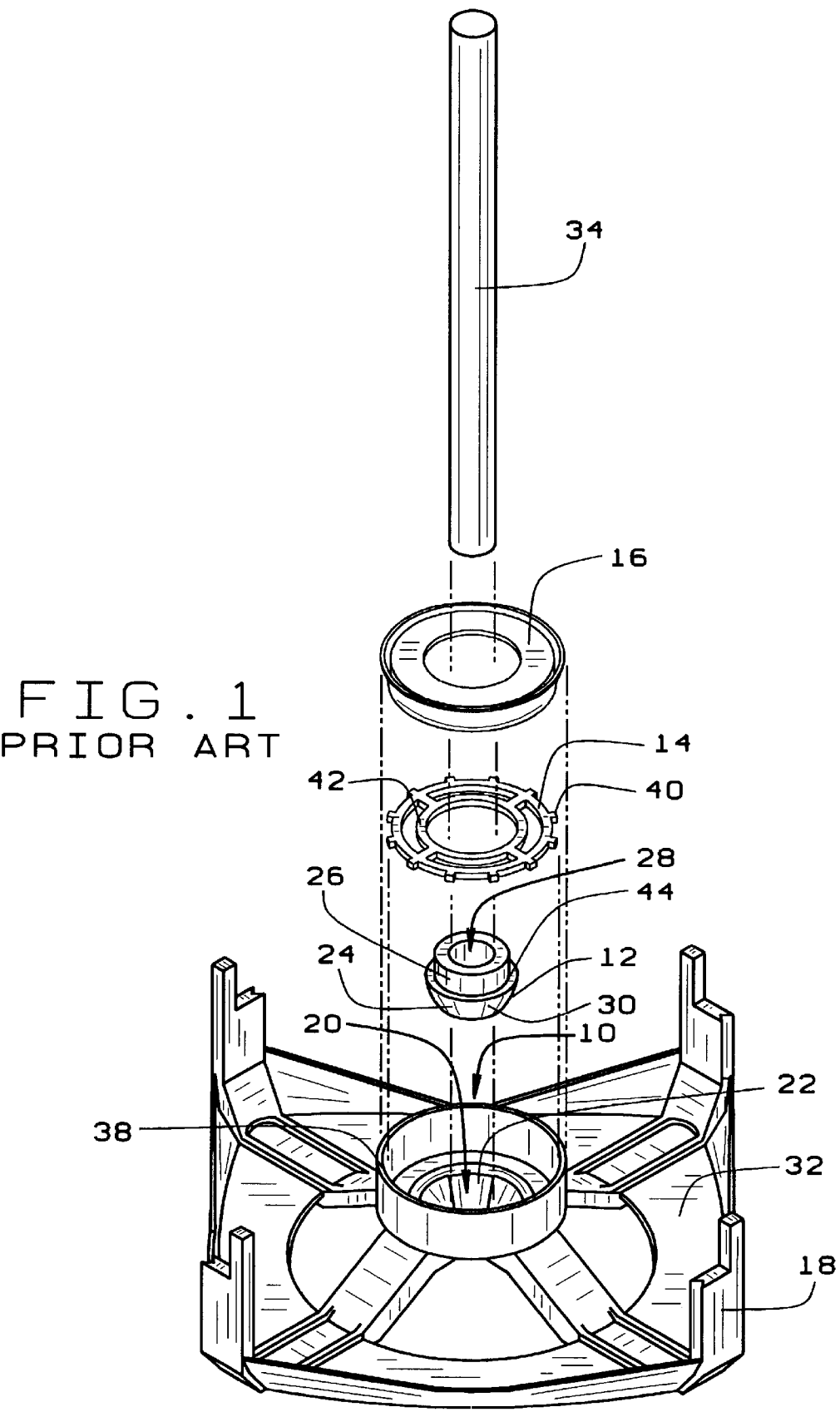
FIG. 1 is an exploded isometric view of the prior art self-aligning bearing assembly.

The rigid shaft supporting bearing assembly of the present invention makes use of many of the component parts of the prior art self-aligning bearing assembly. However, the construction of the bearing seat in the rigid shaft supporting bearing assembly is different from that of the prior art, and the construction of the bearing bushing is altered during assembly of the bearing assembly and therefore also differs from the bearing bushing of the self-aligning bearing assembly of the prior art.

The rigid bearing assembly of the invention is basically comprised of a bearing seat 50, a bearing bushing 52, a retaining ring, lubricant and a sealing cap. The retaining ring and sealing cap are identical to those employed in the self-aligning bearing assembly and therefore will not be described further.

The bearing seat 50 is shown in the fragmented plan view of FIG. 4. The modified bearing seat is also cast as an integral part of a motor housing end shield 54, only portions of which are shown in FIG. 4. Preferably, the bearing seat and the end shield are all cast of aluminum. The bearing seat also has a shaft opening 56 at its center. A plurality of land surfaces 58 are spacially arranged around the shaft opening 56. On the bearing seat shown in FIG. 4, there are three land surfaces 58. However, as explained earlier with regard to the prior art self-aligning bearing assembly, there could be a single land surface completely surrounding the shaft opening. A cylindrical collar 60 surrounds the bearing seat 50 and projects upwardly from the end shield interior surface 62.

Figure 5:
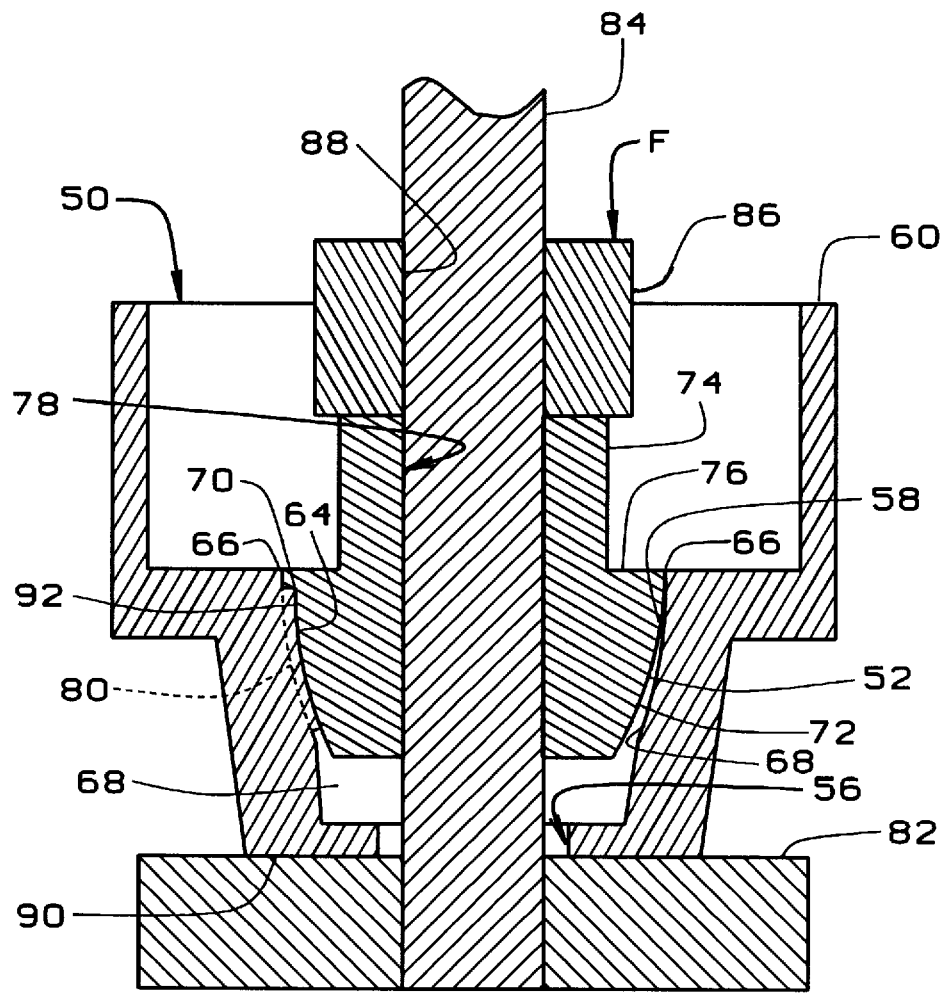
FIG. 5 is a cross-section view of the assembly table and assembly shaft employed in assembling the modified rigid bearing assembly of the invention.

The modified bearing seat 50 differs from the prior art bearing seat 10 in that a plurality of projections 64 are cast into the bearing seat. The projections 64 are arranged in pairs and are positioned on arcuately opposite sides of each land surface 58. The projections 64 are formed as curved ribs that follow the curvature of each of the land surfaces 58 but project slightly outwardly from the land surfaces. As seen in FIGS. 4 and 5, each of the land surfaces has an upper edge 66 that is spaced furtherest away from the shaft opening 56 and a lower edge 68 that is positioned closest to the shaft opening 56. Each projection rib 64 begins just below the upper edge surface 66 of the lands and then extends downwardly generally following the curvature of the land surface but projecting slightly outwardly from the land surface. Each projection rib 64 has an upper end 70 spaced from the upper edge 66 of the land surface. With the land surfaces 58 having a configuration complimentary to the bearing surface of the bushing and being spacially arranged to engage the bushing bearing surface in sliding contact, it can be appreciated that the upper ends 70 of each of the rib projections 64 will engage with the bushing bearing surface before the bearing surface engages the land surfaces 58 when the bushing is assembled into the bearing seat 50.

FIG. 5 is a schematic representation of a tool employed in assembling the bearing bushing 52 into the modified bearing seat 50. The bearing bushing 52 is identical to the prior art self-aligning bearing bushing 12, is constructed of the same material, and also comprises a semi-spherical forward end 72 and a cylindrical rearward end 74. The forward and rearward ends of the bushing are separated by the annular shoulder 76. A center shaft bore 78 passes through the bearing and the forward end of the bearing has a semi-spherical bearing surface 80. Prior to assembly of the bearing bushing 52 into the bearing seat 50, the bushing bearing surface 80 is a smooth surface shaped complimentary to the cup or socket shape surface defined by the bearing seat land surfaces 58.

The tool shown in FIG. 5 used in assembling the modified rigid bearing assembly is comprised of an assembly table or base 82 and an assembly shaft 84. The base 82 has a planar top surface and the shaft 84 projects upwardly from the base top surface with its center axis (not shown) positioned perpendicular to the plane of the base top surface. The assembly shaft 84 is dimensioned to have the same exterior diameter of the motor shaft with which the bearing assembly is to be employed.

The anvil 86 is a cylindrical piece of metal having a center bore 88 dimensioned to be received over the assembly shaft 84 for sliding movement thereon.

In the method of assembly, the motor end shield bearing seat 50 is positioned over the assembly shaft 84 with the shaft passing through the shaft opening 56 of the bearing seat. An exterior surface 90 of the bearing seat rests on the assembly table 82. This exterior surface 90 of the bearing seat is designed so that, when it rests on the top surface of the assembly table 82, the center axis (not shown) of the bearing seat shaft opening 56 is coaxial with the center axis (not shown) of the assembly shaft 84.

Next, the bearing bushing 52 is placed on the assembly shaft 84 with the bushing shaft bore 78 sliding over the assembly shaft. The bearing bushing is moved downwardly over the shaft toward the bearing seat land surfaces 58. However, as explained above, the bushing bearing surface 58 will first come into contact with the projection rib upper ends 70 before it contacts the land surfaces 58. The anvil 86 is then assembled over the assembly shaft with the shaft passing through the anvil center bore 88. The anvil is moved downwardly until it engages the cylindrical rearward end 74 of the bearing bushing.

Next, a downward force (F) is applied to the anvil 86 by a press (not shown) or any other equivalent mechanism known in the art. The downward force (F) has a predetermined magnitude that is not exceeded. The magnitude of the force (F) is sufficient to cause the bearing bushing 52 to move further downwardly as shown in FIG. 5 resulting in the projection rib upper ends 70 of the harder cast aluminum material of the bearing seat deforming the softer material of the bushing bearing surface 80. This results in the projection rib upper ends 70 forming deformations in the bushing bearing surface 80 as the bushing is continued to be pressed downwardly by the force (F). The force (F) will continue to push the bearing bushing 52 downwardly until the bushing bearing surface 80 comes into contact with the bearing seat land surfaces 58. At this point in the assembly process, the surface area of contact between the bearing seat 50 and the bushing 52 changes. Prior to engagement of the land surfaces 58 with the bushing bearing surface 80, only the upper ends 70 of the projection ribs engaged with the bushing bearing surface 80 and resisted the downward applied force (F). With the increase in surface area contact with the bushing bearing surface 80 now coming into contact with the land surfaces 58 of the bearing seat, the magnitude of the applied force (F) is no longer large enough to continue pushing the bearing bushing 52 downwardly and the bushings' downward movement stops. The extent that the ribs project outwardly from the bearing surface and the magnitude of the force applied to the anvil are sufficient to cause the creation of the deformations in the spherical bushing surface without appreciably changing or distorting the shaft bore 28 of the bushing. With the bushing seated against the land surfaces, the retaining ring is next installed. With the bushing seated against the land surfaces, the retaining ring 14 is next installed. At this point, the assembly of the bearing bushing 52 into the bearing seat 50 is completed and the bushing and bearing seat are removed from the tool shown in FIG. 5. The lubricant and sealing cap 16 are then inserted into the bearing seat collar 38.

The assembly of the bearing bushing 52 into the bearing seat in this manner forms a plurality of deformations 92 into the bushing bearing surface 80. Each of these deformations 92 is formed by the upper ends 70 of the projecting ribs and is complimentary to the configurations of the ribs. Each of the rib upper ends 70 extends into a deformation 92 and thereby prevents any relative movement of the bearing bushing 52 to the bearing seat 50. In this manner, the modified bearing seat 50 of the invention is used with existing inventory from a self-aligning bearing assembly to form a rigid shaft supporting bearing assembly.

While the present invention has been described by reference to a specific embodiment, it should be understood that modifications and variations of the invention may be constructed without departing from the scope of the invention defined in the following claims.

What is claimed is:

1. A rigid bearing assembly comprising:

a bearing seat having a land surface positioned for engagement with a bearing inserted into the bearing seat, and a projection on the bearing seat protruding outwardly from the land surface;

a bearing inserted into the bearing seat, the bearing having a bearing surface engaging with the land surface and the bearing having a deformation formed into the bearing surface with the projection on the bearing seat extending into the deformation and holding the bearing stationary relative to the bearing seat; and the bearing seat land surface and the projection are formed as a single piece with a motor end shield.

2. A rigid bearing assembly comprising:

a bearing seat having a land surface positioned for engagement with a bearing inserted into the bearing seat, and a projection on the bearing seat protruding outwardly from the land surface;

a bearing inserted into the bearing seat, the bearing having a bearing surface engaging with the land surface and the bearing having a deformation formed into the bearing surface with the projection on the bearing seat extending into the deformation and holding the bearing stationary relative to the bearing seat; and the land surface is a concave surface and the bearing surface is a convex surface.

3. The bearing assembly of claim 2, wherein:

the projection is one of a number of projections on the bearing seat protruding outwardly from the land surface;

the deformation is one of a number of deformations formed into the bearing surface; and the number of projections extend into the number of deformations and hold the bearing stationary relative to the bearing seat.

4. The bearing assembly of claim 2, wherein:

the projection is one of a pair of projections on the bearing seat protruding outwardly from the land surface;

the deformation is one of a pair of deformations formed into the bearing surface; and the pair of projections on the bearing seat extend into the pair of deformations in the bearing surface and hold the bearing stationary relative to the bearing seat.

5. The bearing assembly of claim 4, wherein:

the bearing seat has a shaft hole passing therethrough and the land surface extends arcuately around at least a portion of the shaft hole, and the pair of projections are positioned on opposite sides of the land surface.

6. The bearing assembly of claim 5, wherein:

the bearing has a shaft bore extending therethrough and the bearing surface extends around the shaft bore.

7. The bearing assembly of claim 2, wherein:

the bearing seat has a shaft hole passing therethrough and the land surface extends axially and radially away from the shaft hole to a radially outer edge of the land surface, and the projection is positioned between the shaft hole and the outer edge.

8. A rigid bearing assembly comprising:

a bearing seat having a land surface positioned for engagement with a bearing inserted into the bearing seat, and a projection on the bearing seat protruding outwardly from the land surface;

a bearing inserted into the bearing seat, the bearing having a bearing surface engaging with the land surface and the bearing having a deformation formed into the bearing surface with the projection on the bearing seat extending into the deformation and holding the bearing stationary relative to the bearing seat; and the bearing seat is constructed of a material having a hardness and the bearing is constructed of a material having a hardness that is less than the hardness of the bearing seat material.

9. The bearing assembly of claim 8, wherein:

the projection is one of a number of projections on the bearing seat protruding outwardly from the land surface;

the deformation is one of a number of deformations formed into the bearing surface; and the number of projections extend into the number of deformations and hold the bearing stationary relative to the bearing seat.

10. The bearing assembly of claim 8, wherein:

the bearing seat land surface and the projection are formed as a single piece of material.

11. A rigid bearing assembly comprising:

a bearing seat having a land surface positioned for engagement with a bearing inserted into the bearing seat, and a projection on the bearing seat protruding outwardly from the land surface;

a bearing inserted into the bearing seat, the bearing having a bearing surface engaging with the land surface and the bearing having a deformation formed into the bearing surface with the projection on the bearing seat extending into the deformation and holding the bearing stationary relative to the bearing seat;

the bearing seat has a shaft hole passing therethrough and the land surface is one of a plurality of separate land surfaces spacially arranged around the shaft hole; and the projection is one of a plurality of projections on the bearing protruding outwardly from the land surfaces, and the plurality of projections are arranged in pairs of projections positioned on opposite sides of one of the land surfaces of the plurality of land surfaces.

12. A bearing assembly comprising:

a bearing seat having a shaft hole at a center of the bearing seat and having a plurality of land surfaces and a plurality of projections arranged around the shaft hole, the plurality of projections are positioned between the plurality of land surfaces and protrude outwardly from the plurality of land surfaces; and a bearing positioned in the bearing seat, the bearing has a shaft hole through a center of the bearing and a bearing surface around the bearing shaft hole, a plurality of deformations are formed on the bearing surface, the bearing surface engages with the land surfaces of the bearing seat and the projections of the bearing seat engage with the bearing surface deformations.

13. The bearing assembly of claim 12, wherein:

each land surface of the plurality of land surfaces is a concave surface that arcs around the bearing seat shaft hole.

14. The bearing assembly of claim 13, wherein:

each land surface has opposite upper and lower edges with the lower edges positioned closer to the bearing seat shaft hole than the upper edges, and each land surface is a concave surface that arcs as it extends from its upper edge to its lower edge.

15. The bearing assembly of claim 13, wherein:

the plurality of projections are all spatially arranged relative to each other around the bearing seat shaft hole.

16. The bearing asse3mbly of claim 13, wherein:

the plurality of projections are arranged in pairs and each projection of a pair is positioned on an arcuately opposite side of one of the plurality of land surfaces as the land surface arcs around the bearing seat shaft hole.

17. The bearing assembly of claim 12, wherein:

each land surface has opposite upper and lower edges with the lower edges positioned closer to the bearing seat shaft hole than the upper edges, and each projection is a narrow rib that extends between the upper and lower edges of a land surface.

18. The bearing assembly of claim 17, wherein:

each projection rib is positioned adjacent a land surface and tapers outwardly from the land surface as it extends between the lower edge and the upper edge of the land surface.

19. The bearing assembly of claim 12, wherein:

the bearing surface deformations are holes recessed into the bearing surface.

20. The bearing assembly of claim 12, wherein:

the plurality of land surfaces are spatially arranged apart from each other around the bearing seat shaft hole.

* * * * *